United States Patent [19]

Healy

[11] 4,333,992
[45] Jun. 8, 1982

[54] METHOD FOR PRODUCING STEAM FROM THE LIQUID IN A MOIST GAS STREAM

[75] Inventor: Herbert C. Healy, Hebron, Conn.
[73] Assignee: United Technologies Corporation, Hartford, Conn.
[21] Appl. No.: 202,049
[22] Filed: Oct. 30, 1980
[51] Int. Cl.³ .............................................. H01M 8/04
[52] U.S. Cl. .................................... 429/17; 429/26; 429/46; 60/715
[58] Field of Search ........................ 429/17, 19, 26, 46; 60/715; 122/7 R

[56] References Cited

U.S. PATENT DOCUMENTS 4,001,041 1/1977 Menard ............................ 429/19 X Primary Examiner—Charles F. LeFevour
Attorney, Agent, or Firm—Stephen E. Revis

[57] ABSTRACT

To avoid using high quality heat to boil water condensed from a moist gas stream and to increase the overall thermal efficiency in a system requiring a supply of steam obtained by boiling water condensed from a moist gas stream, the condensing of the desired amount of water is done in a combined condenser/boiler wherein the condensed out water is separated from the gas stream, reduced in temperature, and throttled to a pressure wherein it is converted to steam back in the condenser/boiler using only the heat of condensation and sensible heat from the moist gas stream during the condensing step.

7 Claims, 2 Drawing Figures

METHOD FOR PRODUCING STEAM FROM THE LIQUID IN A MOIST GAS STREAM

TECHNICAL FIELD

This invention relates to water recovery systems.

BACKGROUND ART

Some power plants and many industrial operations need to recover water from an available moist gas stream and to convert the recovered water to steam for use in the system. Typically the moist gas stream is passed through a condenser and the water which is collected is then boiled using heat from elsewhere in the system, which is usually high quality waste heat. Thus, in these systems, low quality heat of condensation of the water becomes available at the expense of the high quality heat used to convert the water to steam. In systems wherein the high quality waste heat is necessary in the performance of some other application, the loss of such high quality waste heat to produce low quality steam is an inefficient use of thermal energy. For example, in a cogeneration system, wherein a fuel cell is the primary source of energy, high quality waste heat from the fuel cell is required in the cogeneration application for processing, heating, or to produce additional electrical energy by driving an electric generator. The fuel cell system might also require steam, such as for use in a steam reforming reactor which converts hydrocarbons to the hydrogen which is used in the fuel cells. Pressurized fuel cell power plants, such as those described in commonly owned U.S. Pat. Nos. 3,982,962 and 4,004,947 obtain the water for the steam reform reactor by condensing it out of the fuel cell exhaust gas streams, which are a source of high quality heat. The water is converted to steam in a separate boiler using this high quality waste heat, or by passing the water into heat exchange relationship with other sources of high quality heat. The result, in these instances, is less high quality heat and less usable heat for a cogeneration application and, ultimately, lower overall system efficiency.

DISCLOSURE OF INVENTION

One object of the present invention is an efficient method for removing water from a moist gas stream and converting that water to steam.

Another object of the present invention is an efficient cogeneration system for the production of useful energy.

According to the broadest aspect of the present invention, water is condensed from a moist gas stream in a combination condenser/boiler, and the condensed water is thereafter reduced in pressure and temperature and converted to steam in the condenser/boiler using the heat of condensation from the condensing step and the sensible heat from the moist gas stream during the condensing.

In one embodiment the moist gas stream is a source of high quality heat. Its temperature is reduced to just above the dew point of the stream by using some of the high quality heat, such as for a cogeneration application which requires high quality heat. The reduced temperature moist gas stream is then passed through a combination condenser/boiler wherein the temperature of the gas stream is reduced to a temperature below the dew point, low enough to condense out the desired amount of water from the stream. The pressure of the gas stream remains substantially the same during this step. The condensed out water is then separated from the gas stream and reduced in temperature to the point where the heat of vaporization requirements of the condensed water is just equal to or less than the heat of condensation from the condensing step plus the sensible heat given up by the moist gas stream during the condensing. The pressure is then reduced such that the boiling temperature of the liquid is lower than the temperature to which the moist gas stream was reduced during the step of condensing. The separated, reduced temperature/reduced pressure water is reintroduced into the condenser/boiler and vaporized using the heat of condensation and sensible heat from the moist gas stream given up during the condensing step. By this method water is condensed from a gas stream and converted to steam without expending high quality heat in the condensing/vaporizing process. Thus, such high quality heat may be used for other applications which require it.

In a pressurized fuel cell power plant with cogeneration the exhaust from the fuel cell is a moist, hot, pressurized gas stream which contains high quality waste heat. Assuming the power plant includes a steam reforming reactor for hydrogen generation, it is desirable to use the water in the moist exhaust stream for the steam reforming. For high overall efficiency (i.e., thermal and electrical) it is also desirable to maximize the amount of high quality heat available directly for cogeneration. According to the present invention, the temperature of the moist exhaust stream is first reduced to just above its saturation temperature or dew point by extracting the high quality heat for cogeneration use. The desired amount of water is then condensed out, at substantially constant pressure, in the condenser portion of a combination condenser/boiler by reducing the temperature of the moist gas stream to an appropriately low temperature therein. The condensed out water is separated from the gas stream and reduced further in temperature to the point where its heat of vaporization requirements are equal to or somewhat less than the heat of condensation from the condensing step and the sensible heat given up by the moist gas stream during the condensing step. The pressure of this lower temperature water is then reduced such that its boiling point is lower than the temperature of the gas stream just after condensation is completed. This lower pressure, lower temperature liquid is then introduced into the boiler portion of the condenser/boiler whereupon it is vaporized and may even be superheated using only heat given up by the moist gas stream during condensing, which is the heat of condensation plus the sensible heat from the moist gas stream. The low pressure steam is then raised via compression to the pressure desired in the steam reform reactor and used therein.

BEST MODE FOR CARRYING OUT THE INVENTION

Figure 1:
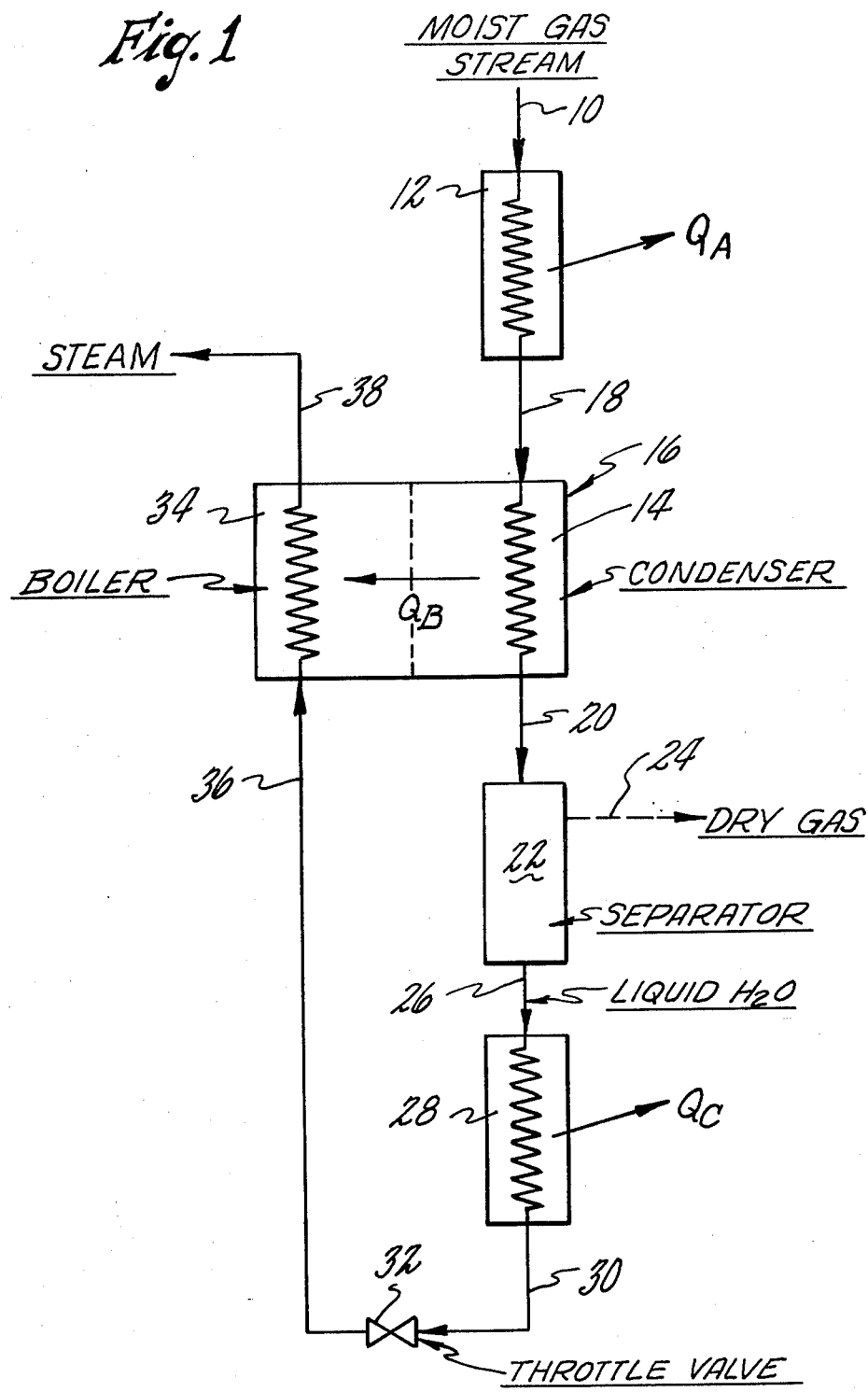
FIG. 1 is a schematic representation of a system for practicing the method of the present invention.

As an exemplary embodiment of the present invention, consider the system shown in FIG. 1. A moist gas stream from a source not shown flows in a conduit 10.

The stream is at a temperature above the dew point of the water in the stream. Preferably, but not necessarily, the stream is at a high temperature and high pressure such that it is a source of high quality heat. The term "high quality heat" as used herein, is heat of sufficient temperature to produce steam at 100 psia or greater. Whether or not the stream is a source of high quality heat, its temperature $T_1$ is preferably reduced, such as in a heat exchanger 12, to a temperature $T_2$ which is as close as practicable to the dew point or saturation temperature of the gas stream. Typically this is 10° to 20° F. above the dew point, but it may be as high as 50° F. above the dew point. If the gas stream is a source of high quality heat, the heat $Q_A$ given off in the heat exchanger would be high quality heat suitable for a cogeneration application.

From the heat exchanger 12 the moist gas stream, at a temperature $T_2$ and a pressure $P_1$, enters the condenser portion 14 of a combined condenser/boiler 16 via a conduit 18. In the condenser portion 14 heat $Q_B$ is removed from the moist gas stream, without substantially reducing the pressure of the gas stream, such that the stream's temperature is reduced to $T_3$. $T_3$ is below the dew point of the gas stream. Water thereby condenses out of the gas stream; and a mixture of water and gas leaves the condenser portion 14 at a temperature $T_3$ and pressure $P_1$ via a conduit 20.

From the conduit 20 the water and gas mixture enters a separator 22 wherein the condensed liquid is separated from the gas. The gas, which is now "dry" gas relative to the original moist gas stream, leaves the separator 22 via the conduit 24 and may be used elsewhere, depending upon its composition, temperature, and pressure. Although shown as separate components, the separator 22 may be an integral part of the condenser/boiler 16, as is well known in the art.

The liquid water leaves the separator 22 via a conduit 26 and enters a heat exchanger or radiator 28 whereupon heat $Q_C$ is extracted to reduce its temperature to $T_4$. The heat $Q_C$ is removed from the liquid water to balance the system as will be explained below. The heat is low quality heat and may either be used or discarded as seen fit. The liquid water leaves the heat exchanger 28 via a conduit 30 and is passed through a throttle valve 32 to reduce its pressure to a pressure $P_2$. As will be apparent shortly, the pressure $P_2$ must be low enough such that the boiling point of the liquid water is less than the temperature $T_3$ but equal to or greater than the temperature $T_4$.

The liquid water, at the pressure $P_2$ and temperature $T_4$, is thereupon introduced into the boiler portion 34 of the condenser/boiler 16 via the conduit 36 and is converted to steam or boiled using only the heat $Q_B$, which is the heat of condensation of the liquid water plus sensible heat from the moist gas stream passing through the condenser portion 14. Steam at the pressure $P_2$ and at a temperature $T_5$ (equal to the boiling point or somewhat higher i.e., superheated), leaves the boiler portion 34 via the conduit 38.

The condenser/boiler may, in this embodiment, be a plate type heat exchanger or a shell and tube type heat exchanger wherein liquid is condensed on one side of a heat exchanger wall while the condensed liquid is boiled on the other side of the wall. The liquid water entering the boiler portion serves as the sink for the heat of condensation and the sensible heat from the condensing portion. The direct use of the condensed water as the sink for the heat of condensation results in high heat transfer coefficients which means a reduction in the total heat transfer surface area typically required for water recovery.

As mentioned above, the temperature of the condensed out liquid water is reduced before converting it to steam in order to put the system into heat balance. This must be done because the heat in the moist gas stream is much greater than is necessary to vaporize the water as it passes through the boiler portion 34. If the excess heat is not removed (such as in the heat exchanger 28 or by using it to superheat the steam produced in the condenser/boiler) it would enter the boiler portion 34 along with the liquid water. In that case the desired amount of water could not be condensed and/or the desired amount of superheating could not be accomplished. Most preferably, the amount of heat $Q_C$ which is removed from the liquid water in the heat exchanger 28 is just enough to reduce its temperature to the point where the heat of vaporization requirements and steam superheating requirements (if any) of the condensed water is approximately equal to the heat of condensation of the desired amount of water to be condensed from the moist gas stream plus the sensible heat given up by the moist gas stream to that water during the step of condensing.

As an alternative to the heat exchanger 28 the system could be heat balanced by adding a quantity of liquid water from another source to the condensed water such that the heat of vaporization and superheating requirements of the combined quantity of water just equaled the heat of condensation of the condensed water plus the sensible heat of the moist gas stream given up to the combined quantity of water during the condensing step. This would eliminate the loss of heat $Q_C$.

As also mentioned above, the liquid water is throttled to reduce its boiling point to a temperature lower than $T_3$, which is the temperature of the gas stream and water leaving the condenser portion 14. This is required if the stream being condensed is to be able to heat the water in the boiler portion 34 to above its boiling point. The greater the ΔP across the throttle valve, the greater will be the approach temperature and the smaller will be the required heat transfer surface area of the condenser/boiler; however, the greater the ΔP the lower the pressure of the steam produced, which is another consideration in selecting the best approach temperature for a particular system. Also, the boiling point should not be reduced below $T_4$, of the water will all flash to steam upon being throttled which, of course, would defeat the purpose of this system. For practical purposes the minimum acceptable approach temperature is about 20° F.

Figure 2:
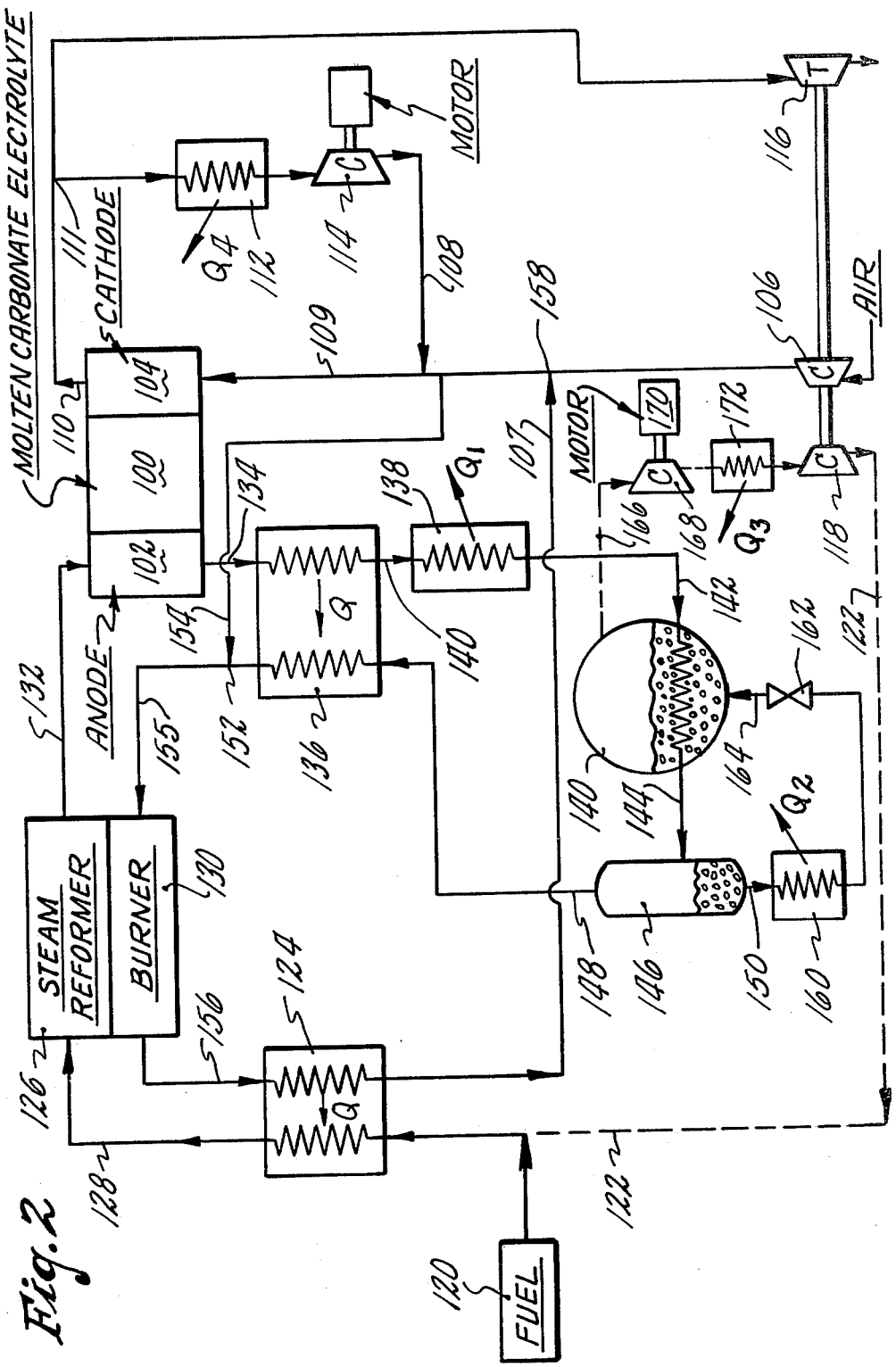
FIG. 2 is a schematic representation of a fuel cell cogeneration system incorporating the method of the present invention.

Turning to FIG. 2, a fuel cell power plant for a cogeneration system is shown schematically. The fuel cell power plant is the primary energy source for the cogeneration system and produces electricity. The waste heat may be used to generate steam for a cogeneration application such as for use in the meat processing or paper manufacturing industry. In this fuel cell power plant the fuel cells are shown schematically as a single cell 100 comprising an anode and fuel gas space 102, a cathode and oxidant gas space 104, and molten carbonate electrolyte disposed therebetween. A power plant would normally have hundreds of these cells connected electrically in series/parallel combinations. Molten carbonate cells operate at temperatures of about 1200° F. nominal. In this embodiment the power plant is pressurized, which means that the fuel cells operate on a pressurized fuel and pressurized oxidant. In this case it is assumed the cells operate at a pressure of about 150 psia. For purposes of explanation and simplicity, it is also assumed that there are no frictional pressure losses.

In operation, air, which is the oxidant for the fuel cell 100, is compressed in a compressor 106 to 150 psia. An appropriate amount of this compressed air, mixed with depleted anode exhaust from a conduit 107 and recycled cathode exhaust from a conduit 108, is fed to the cathode space 104 via the conduit 109. Depleted oxidant exhausts from the cathode via the conduit 110 at a temperature of about 1300° F. and at a pressure of about 150 psia. This exhaust stream contains high quality waste heat. The stream is split at 111, and a portion of the gas stream is passed through a heat exchanger 112 where some of this high quality heat is extracted and used for the cogeneration application. This portion of the stream is recompressed in a compressor 114 to 150 psia and recirculated through the cathode space 104. The compressor 114 may be driven by an electric motor. The remaining portion of the cathode exhaust is expanded through a turbine 116 which drives the compressor 106 as well as a compressor 118 whose function will be later explained.

On the anode side of the cell vaporized hydrocarbon fuel from a source 120 is mixed with steam in a conduit 122 which has been pressurized to greater than 150 psia. The mixture is preheated in a heat exchanger 124 and then introduced into a steam reformer 126 via a conduit 128. In the steam reformer the fuel is converted to hydrogen using heat supplied by a burner 130. The stream pressure drops slightly during this step. The hydrogen is fed into the anode space 102 at a pressure of 150 psia via a conduit 132.

A moist anode exhaust stream leaves the anode space 102 via a conduit 134. At this point the moist gas stream is at a pressure of approximately 150 psia and a temperature of 1300° F. This stream contains high quality waste heat from the fuel cells. The stream is cooled somewhat in a regenerative heat exchanger 136 and is then introduced into the heat exchanger 138 via a conduit 140 whereupon a quantity $Q_1$ of high quality heat is extracted and used for the cogeneration application. For example, the heat may be used to generate high quality steam for the industrial processes described above.

The moist anode exhaust stream is then passed through a combined condenser/boiler 140 via a conduit 142 for the purpose of condensing out the desired water from the stream with no substantial pressure drop. In this case the desired amount of water is the steam requirement of the reactor 126. In this system the anode exhaust stream entering the condenser/boiler 140 is at a pressure of approximately 150 psia and a temperature of 323° F. The dew point at this pressure for the particular composition of the anode exhaust is 312° F. It is preferred that the temperature of the moist gas stream entering the condenser/boiler be close to the dew point in order to minimize the size of the required condensing apparatus and to maximize the amount of high quality heat $Q_1$ which may be used for cogeneration.

The liquid/gas mixture leaves the condenser/boiler 140 in the conduit 144 at a temperature of 259° F. and is still at a pressure of approximately 150 psia. This mixture enters a water-gas separator or knock-out drum 146 wherein dry anode exhaust gas leaves via a conduit 148 and essentially pure liquid water leaves via a conduit 150. The dry exhaust gas is regenerated in the heat exchanger 136 and is mixed at point 152 with air at 150 psia from a conduit 154 which was compressed in the compressor 106. It then passes into the burner 130 via the conduit 155. From the burner 130 it is fed into the heat exchanger 124 via the conduit 156, and thence it is combined at 158 with compressed air from the compressor 106 for circulation through the oxidant gas space 104.

Returning to the liquid water in the conduit 150, it is at a pressure of 150 psia and a temperature of 259° F. In this preferred embodiment it is desired to convert the condensed water to steam and, in addition, to superheat the steam within the boiler to assure no condensation occurs during later compression of the steam. This is done by reducing its temperature to 160° F. in a heat exchanger or radiator 160 such that its heat of vaporization and superheating requirements are now approximately equal to the heat of condensation of the water as it was condensed plus the sensible heat given up by the moist gas stream passing through the condenser/boiler 140. The extracted heat $Q_2$ is low quality heat and may be thrown away.

The reduced temperature liquid is then passed through a throttle valve 162 wherein its pressure is reduced to 15 psia. At that pressure, which is about ambient pressure, the boiling point of the water is 213° F. Note that the boiling point of the liquid prior to throttling was 358° F., which, without throttling, would not permit the liquid to be used as a heat sink for the condenser.

The throttled liquid is then introduced into the boiler portion of the condenser/boiler 140 via the conduit 164 and passes in heat exchange relationship to the moist gas stream, picking up the heat of condensation and sensible heat from the moist gas stream. The liquid is thereby boiled, converted to low quality steam having a pressure of 15 psia, and superheated to a temperature of 228° F. Since this is the steam which is to be used for the steam reforming reaction in the steam reformer 126, it must now be pressurized to somewhat greater than the system pressure of 150 psia before it can be used.

As shown in FIG. 2, the steam leaves the condenser/boiler 140 via a conduit 166 and is pressurized to 50 psia in a first stage by a compressor 168 driven by an electric motor 170. Although the electric motor 170 would be powered by electricity generated by the fuel cell 100, the additional high quality heat available for cogeneration as a result of the herein described method of water recovery and steam production more than offsets the auxiliary electrical load to the fuel cells. In any event, energy for compression manifests itself as a rise in temperature of the steam, which may be recovered in a heat exchanger 172 as high quality sensible heat $Q_3$ for the cogeneration application, or may serve to further superheat the steam prior to its utilization in the steam reformer. If the latter route is chosen, other high quality system heat which might normally be used for superheating is now available for the cogeneration application. Pressurization to a desired 160 psia is completed in the compressor 118 which is driven by available expansion energy from the cathode exhaust. It is believed that adjustments could be made to the operating parameters of this fuel cell power plant such that high quality waste heat rather than an electric motor 170 could be used for the first stage of steam compression.

In a system such as that shown in FIG. 2 it has been calculated that 86% of the thermal energy produced will be available as high quality steam (which in this case would be greater than 300 psia) as compared to only 34% for a conventional approach wherein the water is condensed and then sent to a separate boiler for conversion to steam using a high quality source of heat.

Although the invention has been shown and described with respect to a preferred embodiment thereof, it should be understood by those skilled in the art that other various changes and omissions in the form and detail thereof may be made therein without departing from the spirit and the scope of the invention.

I claim:

1. In a power producing plant comprising primary electricity generating means and cogeneration means, wherein said primary electricity generating means produces a moist gas stream containing high quality waste heat at a first pressure and first temperature which is well above the dew point of said stream, and wherein said cogeneration means derives at least part of its energy from high quality waste heat from said primary electricity generating means, and wherein said power plant requires a supply of steam, a method for removing water from said moist gas stream and converting said water to said steam required by said power plant comprising the steps of:

reducing the temperature of said moist gas stream to a second temperature which is still above the dew point of said stream by using the said high quality heat within said moist gas stream to provide energy for said cogeneration means;

introducing said moist gas stream at said second temperature into a condenser/boiler;

condensing water from the gas stream in the condenser/boiler by cooling the gas stream to a third temperature which is below the stream's dew point without significantly reducing the pressure of the gas stream to produce liquid water at said third temperature and at a pressure which is substantially the same as the pressure of the moist gas stream entering the condenser/boiler;

separating the condensed liquid water from the gas stream;

reducing the temperature of the condensed liquid water from said third temperature to a lower, fourth temperature;

reducing the pressure of the condensed liquid water to a second pressure such that the boiling temperature of the water is equal to or lower than said third temperature; and vaporizing the reduced pressure and reduced temperature separated liquid water in said condenser/boiler by heating said liquid at said second pressure using only the heat of condensation from the step of condensing and sensible heat from the moist gas stream passing through said condenser/boiler to produce steam at said second pressure.

2. The method according to claim 1 wherein essentially all the moisture in said moist gas stream is condensed to a liquid in said condenser/boiler.

3. The method according to claim 2 wherein said second temperature is just above the dew point of said moist gas stream.

4. The method according to claim 3 wherein said step of separating produces a substantially dry gas stream, and some of the high quality heat in said moist gas stream, prior to its being introduced into said condenser/boiler, is used to increase the temperature of said dry gas stream.

5. The method according to claim 2 wherein the steam produced in the condenser/boiler is superheated steam.

6. The method according to claim 1, 2, 3, 4 or 5 wherein said primary electricity generating means is a pressurized fuel cell power plant including a plurality of fuel cells and a fuel reactor requiring pressurized steam for the conversion of hydrocarbons to pressurized hydrogen fuel used in the fuel cells, said fuel cells having fuel gas spaces and oxidant gas spaces, and said moist gas stream is the exhaust gas stream from said fuel gas spaces, and said method includes the additional steps of:

compressing the oxidant for said fuel cells in a first compressor driven by energy in the exhaust gas stream from said oxidant gas spaces;

compressing said steam produced in said vaporizing step in a second compressor driven by energy in the exhaust gas stream from said oxidant gas spaces; and delivering said compressed steam into said fuel reactor.

7. The method according to claim 6 wherein said fuel cells utilize molten carbonate electrolyte, including the step of circulating said dry gas stream through the oxidant gas spaces of said cells.

* * * * *